US008312052B2

(12) United States Patent
Larriba Pey et al.

(10) Patent No.: US 8,312,052 B2
(45) Date of Patent: Nov. 13, 2012

(54) PROCESS FOR TRANSFORMING AND CONSULTING DIRECTED AND ATTRIBUTED MULTIGRAPHS BASED ON THE USE OF MAPS AND BITMAPS

(75) Inventors: Josep Lluis Larriba Pey, Barcelona (ES); Norbert Martínez Bazan, Barcelona (ES); Victor Muntes Mulero, Barcelona (ES); Sergio Gómez Villamor, Barcelona (ES)

(73) Assignee: Universitat Politecnica de Catalunya, Barcelona (ES)

( * ) Notice: Subject to any disclaimer, the term of this patent is extended or adjusted under 35 U.S.C. 154(b) by 115 days.

(21) Appl. No.: 13/012,230

(22) Filed: Jan. 24, 2011

(65) Prior Publication Data
US 2011/0191359 A1    Aug. 4, 2011

Related U.S. Application Data

(63) Continuation-in-part of application No. PCT/IB2009/006271, filed on Jul. 17, 2009.

(30) Foreign Application Priority Data

Jul. 22, 2008    (ES) .................................. 200802251

(51) Int. Cl.
*G06F 17/30* (2006.01)
*G06F 17/00* (2006.01)
(52) U.S. Cl. ........ 707/798; 345/629; 345/440; 718/102; 370/379; 717/126
(58) Field of Classification Search .................. 707/798; 345/629, 440; 718/102; 370/379; 717/126
See application file for complete search history.

(56) References Cited

U.S. PATENT DOCUMENTS

| | | | | |
|---|---|---|---|---|
| 6,781,599 | B2 * | 8/2004 | Abello et al. | 345/629 |
| 7,457,286 | B2 * | 11/2008 | Alexander, Jr. | 370/379 |
| 7,640,536 | B1 * | 12/2009 | Whalen et al. | 717/126 |
| 8,087,022 | B2 * | 12/2011 | Anand et al. | 718/102 |
| 8,166,466 | B2 * | 4/2012 | Mohanan et al. | 717/144 |

OTHER PUBLICATIONS

Dex: high-performance exploration on large graphs for information retrieval (CIKM'07, Nov. 6-8, 2007 Lisbon, Portugal).*
Scalable Graph Exploration on Multicore Processors, Agarwal, et al. Nov. 2010.*

* cited by examiner

*Primary Examiner* — Yicun Wu
(74) *Attorney, Agent, or Firm* — RatnerPrestia

(57) ABSTRACT

The present invention establishes a process for creating a set of structures that allows efficient storage and subsequent handling. The multigraph is represented using bitmaps with element counters and mappings between values and organized bitmaps to faciliate the handling of the multigraphs. The bits in the bitmaps represent two aspects of the multigraph: 1) indexing of all the objects of the multigraph as a function of their identifiers and 2) connectivity between objects of the multigraph, whether they are vertices or edges. Mappings allow, given a value, accessing the objects of the multigraph which contain such value. Multigraph operations are solved by accessing the mappings and applying logical operations on the bitmaps. This way of representing a graph allows efficiently performing graph operations such as: inserting a vertex or an edge, inserting an attribute, acquiring the incoming and outgoing edges of an attribute, etc.

22 Claims, 14 Drawing Sheets

| values | bitmaps |
|---|---|
| { } | 0 |
| {1} | 1, 1 |
| {2} | 1, 01 |
| {2, 4, 6, 8} | 4, 01010101 |
| {11, 23} | 2, 000000000010000000000001 |

| mapping M1 | |
|---|---|
| 27 | R |
| 29 | S |
| 32 | R |
| 33 | T |

(b)

| mapping M2 | |
|---|---|
| true | B1 = [4 \| 0 0 1 1 0 0 1 1] |
| false | B2 = [7 \| 1 1 0 0 1 1 0 0 1 1 1] |

Figure 4 attribute A1 id-value mapping

| | |
|---|---|
| 1 | A |
| 2 | B |
| 4 | A |
| 5 | C |
| 7 | C |
| 8 | A | value-bitmap mapping

| | | |
|---|---|---|
| A | B1 = | 3 | 1 0 0 1 0 0 0 1 |
| B | B2 = | 1 | 0 1 |
| C | B3 = | 2 | 0 0 0 0 1 0 1 |

Figure 5

PROCESS FOR TRANSFORMING AND CONSULTING DIRECTED AND ATTRIBUTED MULTIGRAPHS BASED ON THE USE OF MAPS AND BITMAPS

CROSS-REFERENCE TO RELATED APPLICATIONS

This application is a Continuation-in-Part of PCT International Application No. PCT/IB2009/006271 filed Jul. 17, 2009 which claims benefit of priority from Spanish Application No. P 200802251 filed Jul. 22, 2008. The contents of these applications are incorporated herein by reference.

FIELD OF THE INVENTION

The present invention generically relates to a method for operating within networks or multigraphs in computational systems which allows the efficient resolution of various generic operations thereupon.

BACKGROUND OF THE INVENTION

The analysis and the handling of multigraphs in an efficient manner is becoming a necessity given the growing volume of network or multigraph-structured data.

Methods for managing data in multigraph form are known, although they have limitations with respect to the efficient handling and storage capacity of this type of data. Specifically, these methods do not allow efficiently managing data in multigraph form when the size of such data grows significantly. This occurs because the data structures used do not favor the efficient performance of some of the most common operations of multigraphs and, specifically, because: 1) data structures do not allow quickly accessing information as is required by said operations and 2) data structures are not optimized to take into account that the memory capacity is limited. Examples of said operations are: searching for patterns in a multigraph, scanning the multigraph through the relationship of a vertex with its neighbors, finding the diameter of the multigraph, etc.

The use of systems based on traditional data models such as the relational model for the management of multigraphs does not meet the necessary requirements for constructing an efficient system which allows consulting and handling said multigraphs when they are very large. In the relational model it is considered that the data are stored in records which are organized in relationships. While this organization favors consultations in which the most important thing is the information stored in each record, it does not favor some typical consultations of multigraphs relating to the analysis of the relationship between entities.

The use of specific representation systems for multigraphs such as incidence matrices allows efficiently handling multigraphs, but they require that the entire multigraph can be handled in memory and have serious restrictions when the elements of the multigraph contain associated attributes, or when more information besides the actual structure of the multigraph must be stored.

A system is therefore needed for representing generic multigraphs with attributes allowing the consultation and handling of said multigraphs in an efficient manner and without requiring that the entire multigraph fit in the memory available in the system.

The "DEX: High-Performance Exploration on Large Graphs for Information Retrieval (CIKM'07, Nov. 6-8, 2007 Lisbon, Portugal)" discloses a high performance graph database querying system that allows for the integration of multiple data sources. Features disclosed in this paper in common with the current invention are included in the preamble of claim 1.

DEFINITIONS

A graph is a mathematical structure representing a network formed by vertices and edges. The objects of a graph are the set of its vertices and edges.

D1/ A vertex is each of the connecting points or entities of a graph or network.

D2/ An edge is a relationship between two vertices of a graph or network. Generally, an edge is represented as a line between two vertices.

D3/ a directed edge is a relationship between an outgoing or source vertex, and an incoming or sink vertex. Generally, a directed edge is represented as having its source in the outgoing vertex and sink in the incoming vertex.

D4/ In a labeled graph, all vertices and edges have a label. All the objects with the same label are said to belong to the same object type.

D5/ In a graph with attributes, each object can optionally have one or more attributes with an associated value for each of them. Each attribute of an object is identified with a different attribute name.

D6/ In a multigraph, any two vertices can be related by more than one edge of any edge type, directed or not.

D7/ A labeled directed multigraph with attributes is a graph which is defined from the previous definitions D3, D4, D5 and D6.

D8/ Mapping is a non-injective and surjective mathematical application between two sets, the source set of unique codes, and the image set with associated values. In a non-injective application, the elements of the image set can have two or more sources. In a surjective application, all the elements of the image set have at least one source.

D9/ A bitmap, or bit vector, is a data structure compactly storing sequences of true and false logic values, wherein true or presence is represented with the value 1, and false or absence with the value 0. A bitmap of n bits represents a subset of $\{1, 2, \ldots, n\}$, wherein the value i belongs to the subset if the bit in position i of the bitmap is marked 1. Accordingly, the cardinality of said subset is equal to the number of bits marked 1 in the bitmap.

SUMMARY OF THE INVENTION

The present invention relates to a method for representing and handling structured data in generic multigraph or network form, as a result of which considerable improvements are achieved in the efficiency of access to and handling of this data in relation to other representations of this type of data known until now.

The present invention determines structures and methods for the access and manipulation of data for a multigraph representing a network of interest. The multigraph includes two types of objects: vertices representing entities or points in the network of interest and directed edges linking pairs of vertices. Both vertices and edges have unique identifiers within the multigraph and can contain attributes to store characteristics thereof. The objects of a multigraph can optionally be organized in various types. The edges can optionally not be directed. The multigraph is represented using bitmaps with element counters and mappings between values and organized bitmaps for the purpose of facilitating the handling of said multigraphs. The bits in the bitmaps represent two essential aspects of the multigraph: 1) indexing of all the objects of the multigraph as a function of their identifiers and 2) connectivity between objects of the multigraph, whether they are vertices or edges. Mappings allow, given a value, accessing the objects of the multigraph which contain such value. Multigraph operations are solved by accessing the mappings and applying logical operations on the bitmaps.

An example of a multigraph operation is returning the number of objects of a certain type. Solving this operation involves accessing the corresponding bitmap and returning the value stored in the counter of the bitmap.

Another example of a multigraph operation is returning the objects of a certain type the attributes of which meet a series of restrictions as a function of given values. Solving this operation involves accessing, based on the values provided in the restrictions, through the mappings, the bitmaps associated with that attribute. The result is obtained by iteratively applying bitwise logical operations on these bitmaps.

Yet another example of a multigraph operation is obtaining the degree of a vertex in a directed multigraph, i.e., the number of edges going from any vertex to this vertex. Solving this operation involves accessing the bitmap of the particular vertex which contains information about the incoming edges using a direct mapping between the vertex identifier and the bitmap. The result is calculated obtaining the counter of said bitmap.

Yet another example of a multigraph operation is obtaining the vertices connected through at least one edge to a specific vertex. Solving this operation involves accessing the bitmaps of the particular vertex which contains information about the incoming and outgoing edges, respectively, and obtaining from the edges information about the vertices connected to the source vertex through these edges. The result is calculated obtaining the two corresponding bitmaps from the vertex identifier and a value-bitmap mapping, and finding the associated vertices from the acquired edge identifiers and logical operations.

Yet another example of a multigraph operation is obtaining a segmentation of the vertices of a multigraph clustered by their value in a certain attribute. Solving this operation involves iterating on the various values of said attribute and obtaining the bitmap associated with each value through the mapping, acquiring the identifiers of the vertices already classified by their value in said attribute.

Generally, even increasing the complexity of operation, any operation can be performed based on applying simpler operations which end up being translated into the efficient handling of the structures presented in the present invention.

The present invention can be used for the analysis of various networks of interest, such as for example social networks, transactional activity networks, communications and/or transportation networks, hospital networks, networks with bibliographic information, etc.

The present invention can be used in several ways, including in industrial processes, computer-implemented methods, computer programs, IT systems and networks, user interfaces, application programming interfaces and the like.

BRIEF DESCRIPTION OF THE DRAWINGS

To better understand all that is described in this specification, drawings are attached which describe the various structures used in the invention.

FIG. 2 shows bitmaps.

FIG. 4($a$) shows mapping a set of object identifiers to their corresponding values; FIG. 4($b$) shows mapping a set of values to the bitmaps containing the object identifiers associated with said values.

FIG. 5 shows the representation of an attribute of an object type from bitmaps and mappings.

DETAILED DESCRIPTION OF THE INVENTION

Figure 1:
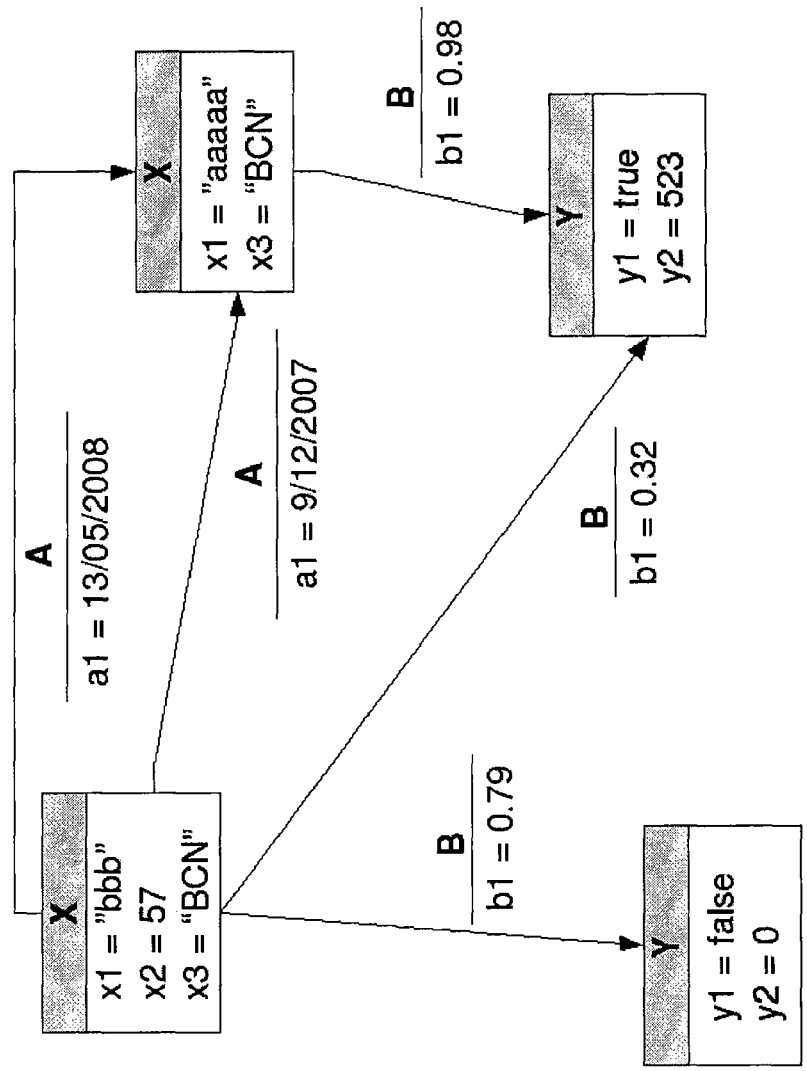
FIG. 1 shows a labeled directed multigraph formed by vertices and edges of different types, wherein each type has associated therewith its own set of attributes.

The present invention applies to a labeled directed multigraph (see definition D7) formed by vertices and edges of different types, wherein each type has associated therewith its own set of attributes such as that represented in FIG. 1. The case in which the multigraph is not directed is a simplified case of the case presented herein, and in any case, the principles of the present invention can also be applied directly to non-directed multigraphs. The same occurs for the case in which the vertices or edges have no type (or, in other words, they have a unique type), or the case in which vertices or edges do not contain attributes.

Each element or entity of the multigraph is a vertex (see D1). In FIG. 1, the vertices are represented in rectangular boxes.

Each relationship or link between two vertices of the multigraph is an edge (see D2). A directed edge (see D3) starts from an outgoing or source vertex and ends in an incoming or sink vertex. In FIG. 1, the edges are arrows going from the outgoing vertex to the incoming vertex, indicated by the tip of the arrow.

All objects in a multigraph, i.e. vertex or edge, belong to a unique object type (see D4). In FIG. 1, the object type is indicated in the heading of the object. In said example there are two types of vertices and two types of edges.

All objects in a multigraph can have a set of associated attributes (see D5). An attribute is made up of an attribute label, also referred to as the name of the attribute, and an associated value, also referred to as value of the attribute. In FIG. 1, the attributes of each object, vertex or edge, are represented by the name of the attribute, the equal sign, and the value of the attribute.

A bitmap (see D8) is a data structure in vector form for storing collections of logical variables in bit form in a compact manner, as represented in FIG. 2.

In the present invention, bitmaps are used to represent vertices or edges of a multigraph and the relationships between them. Furthermore, in the proposed representation it is considered that a bitmap includes a presence counter which counts the number of bits of the structure which have a value of 1. The length of a bitmap depends on the position of the last bit which has a value of 1. In FIG. 1, bitmaps with different contents and lengths, including the empty bitmap, are represented.

There are basic processes or operations for handling a bitmap, such as marking a bit (setting to 1, true or present), unmarking a bit (setting to 0, false or absent), and asking if a bit is at 1 (true or present) or not.

Figure 3:
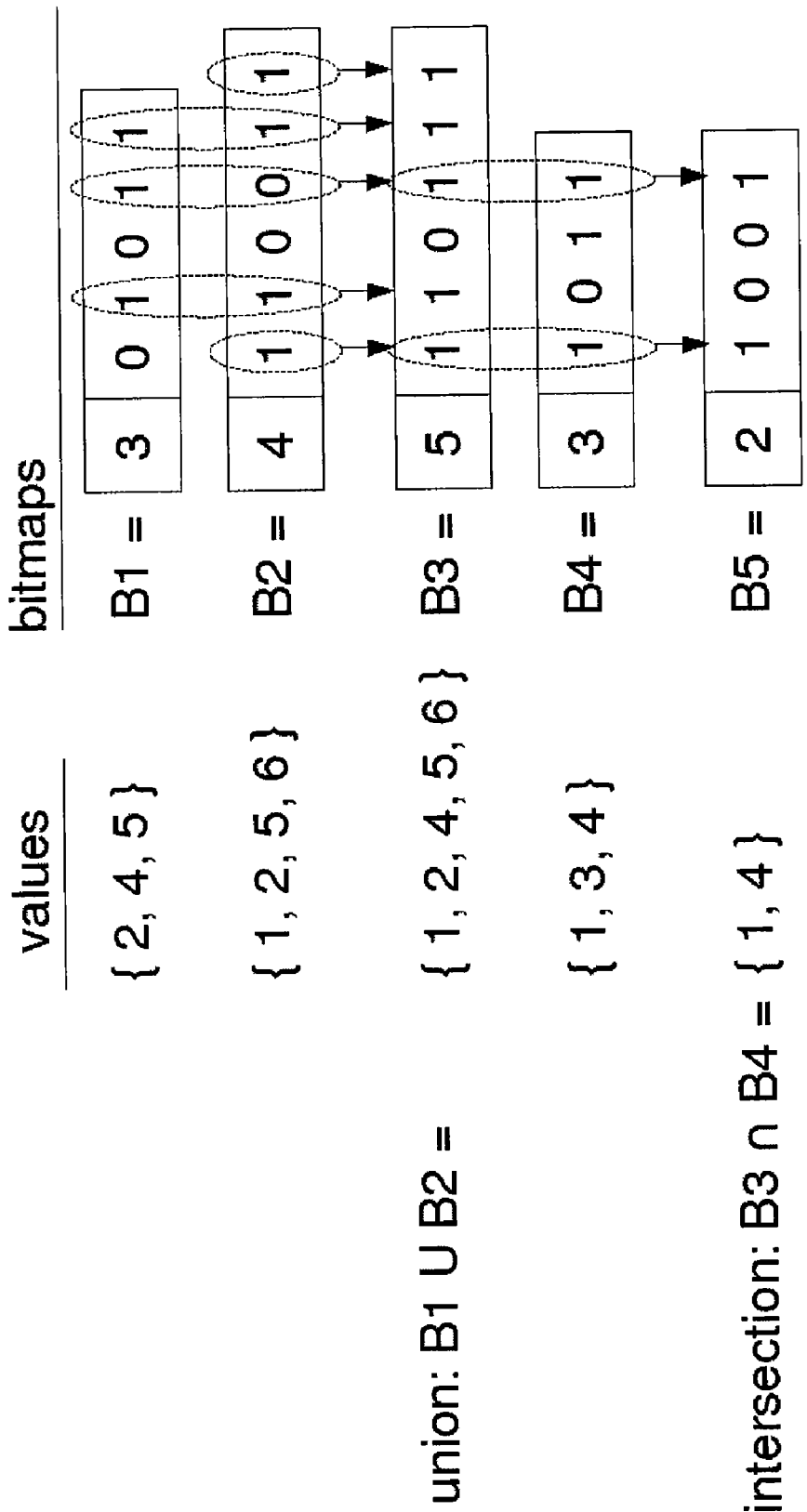
FIG. 3 shows bitwise logical operations on bitmaps, i.e., union and intersection.

There are set theory operations which can be performed from bitwise combinations of bitmaps. For instance, given two bitmaps, the bitwise operations of union (or logical operation OR), wherein the resulting bitmap has all the bits which are marked 1 in any of the operated bitmaps marked 1, and the intersection (or logical operation AND), the resulting bitmap of which has all the bits which are marked 1 in all of the operated bitmaps marked 1, can be directly calculated. FIG. 3 contains an example of the union of two bitmaps and of their subsequent intersection with another bitmap.

All objects in a multigraph are identified from a unique natural number greater than 0, referred to as object identifier. An object with identifier i>0 belongs to a collection of objects represented by a bitmap only if the position i of the bitmap is marked with 1. Otherwise, the object does not belong to the collection.

A mapping (see D8) is a data structure which relates elements in a source set of unique codes and an image set of data. The present invention uses mappings between object identifiers and values (FIG. 4a), and between values and bitmaps (FIG. 4b). In the figure, the unique codes are represented on the left and their (mapped) associated data or values on the right.

The set of values for each of the objects, vertices or edges, of one and the same attribute of an object type is represented with two mappings, one between the object identifier and its associated value, and the other between each different value and a bitmap specifying the object identifiers of all the objects of that type containing said value in that attribute.

FIG. 5 shows the two mappings defined in the previous paragraph for an specific attribute, where the mapping shown on the left is defined between the object identifier and its associated value, and the one on the right between each unique value and a bitmap. It can be verified that all object identifiers of the left mapping are present in the bitmap associated with their value in the right mapping. Likewise, it can be verified that all the values of the left mapping are found as codes in the right mapping. It can also be verified that the sum of the cardinalities of the bitmaps of the right mapping is equal to the total associations of the left mapping. It can finally be verified that for each value of the right mapping and for each position present (marked 1) in its associated bitmap, there is an association between said position and the value in the left mapping.

Figure 6:
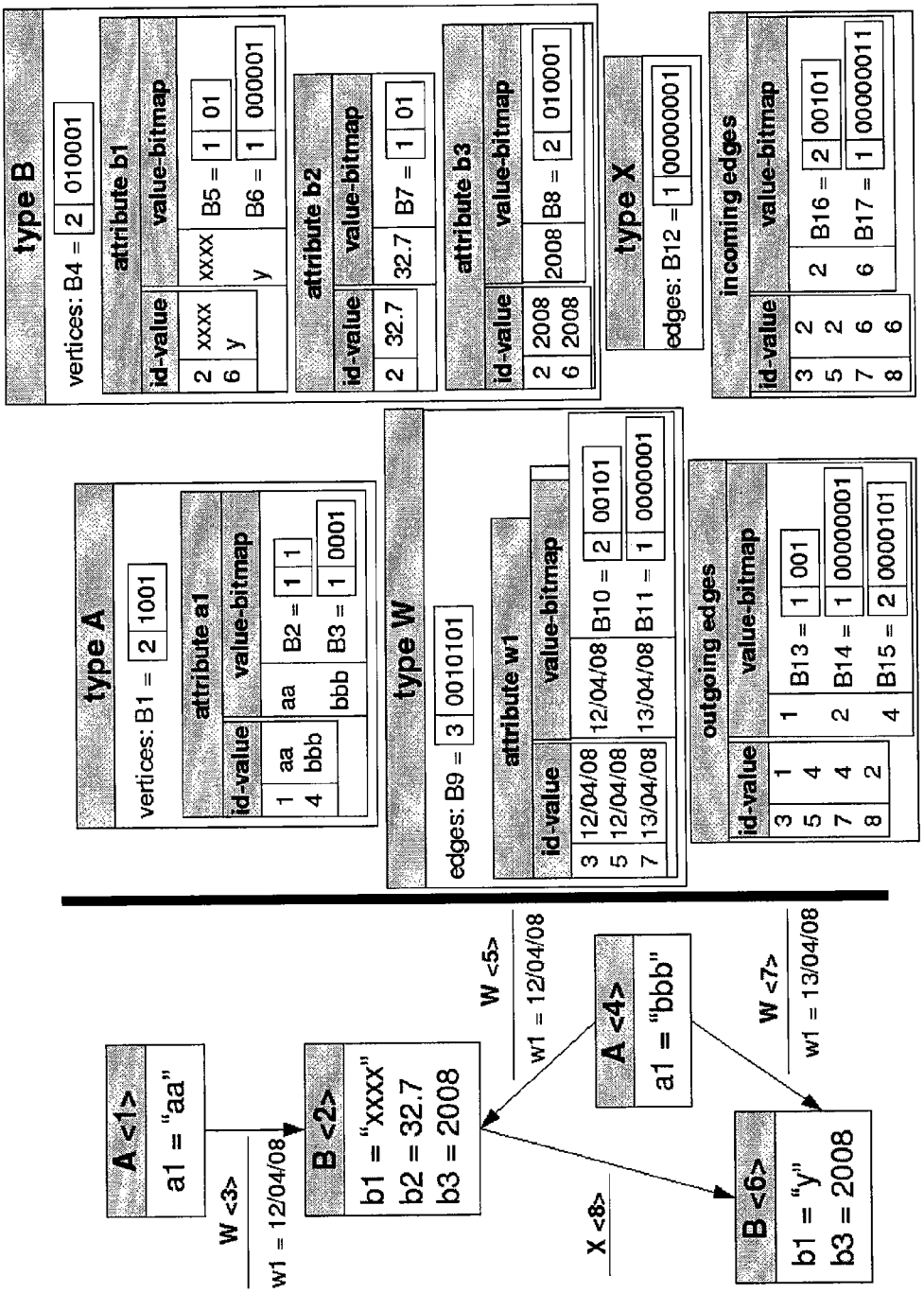
FIG. 6 shows the representation of a directed multigraph from bitmaps and mappings.

For each object type in a directed multigraph there is a bitmap indicating which object identifiers correspond to objects of the specific type, as shown in FIG. 6. The counters of said bitmaps allow immediately knowing how many objects of each type exist in the multigraph.

In FIG. 6, each vertex or edge attribute is represented by its two mappings in a box the title of which contains the name of the attribute.

For each vertex having outgoing edges, there is a bitmap in the mapping of outgoing edges specifying the object identifiers of all the outgoing edges from that vertex, as can be seen in FIG. 6, within the right mapping of the box outgoing edges.

For each vertex having incoming edges, there is a bitmap in the mapping of incoming edges specifying the object identifiers of all the incoming edges from that vertex, as can be seen in FIG. 6, within the right mapping of the box incoming edges.

There is a mapping relating each edge identifier with its outgoing vertex identifier, and another mapping relating each edge identifier with its incoming vertex identifier, as can be verified in FIG. 6, in the left mappings of the boxes outgoing edges and incoming edges.

Figure 7:
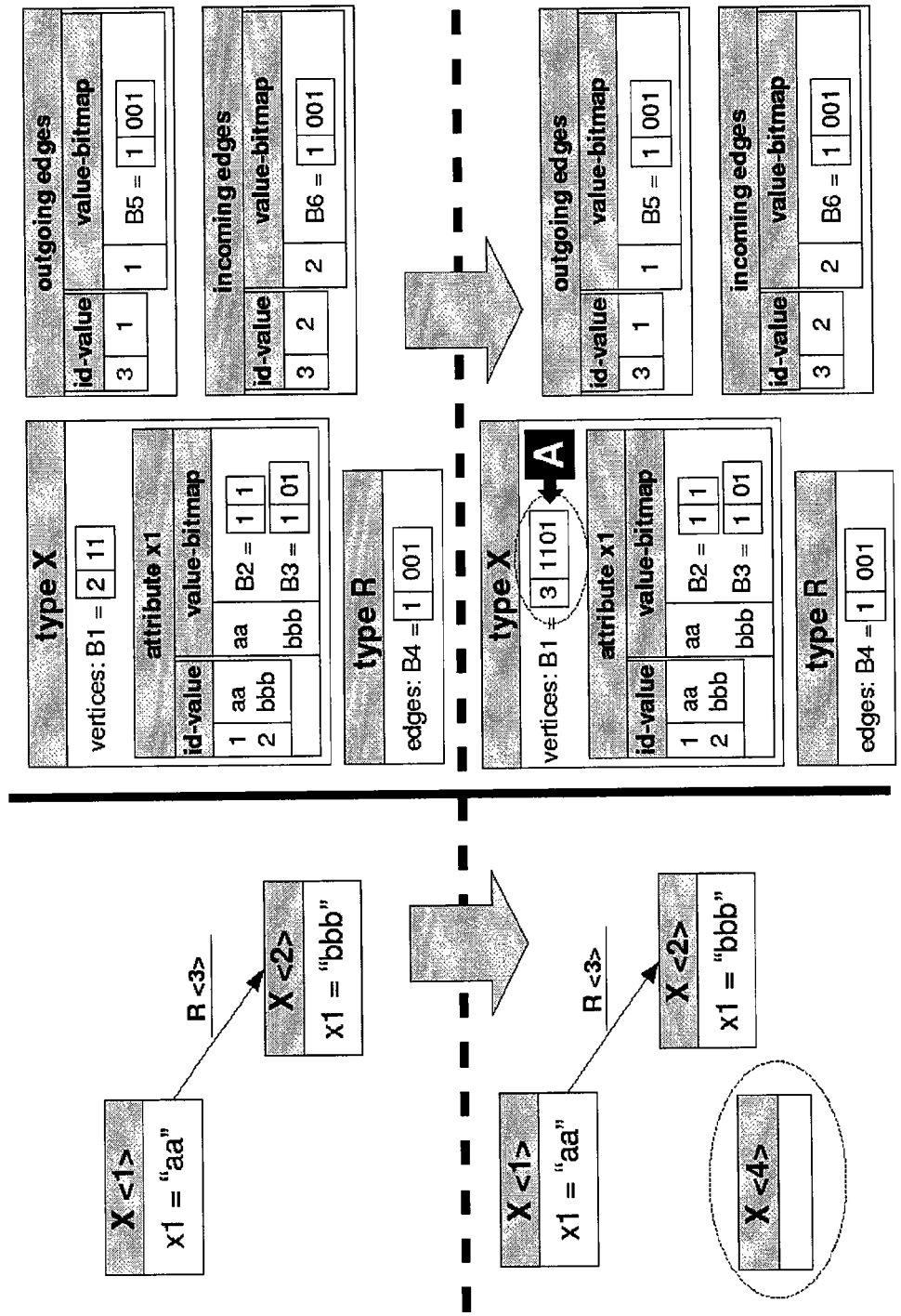
FIG. 7 shows an incoming multigraph and an outgoing multigraph with their respective structures for an insert vertex operation.

To add a new vertex to the multigraph, the position corresponding to the unique vertex identifier is marked in the vertex bitmap of its vertex type and the marked bit counter, which is equal to the total number of vertices of said type, is updated (FIG. 7, action A).

To eliminate a vertex from the multigraph, the previous steps must be undone in the same order.

Figure 8:
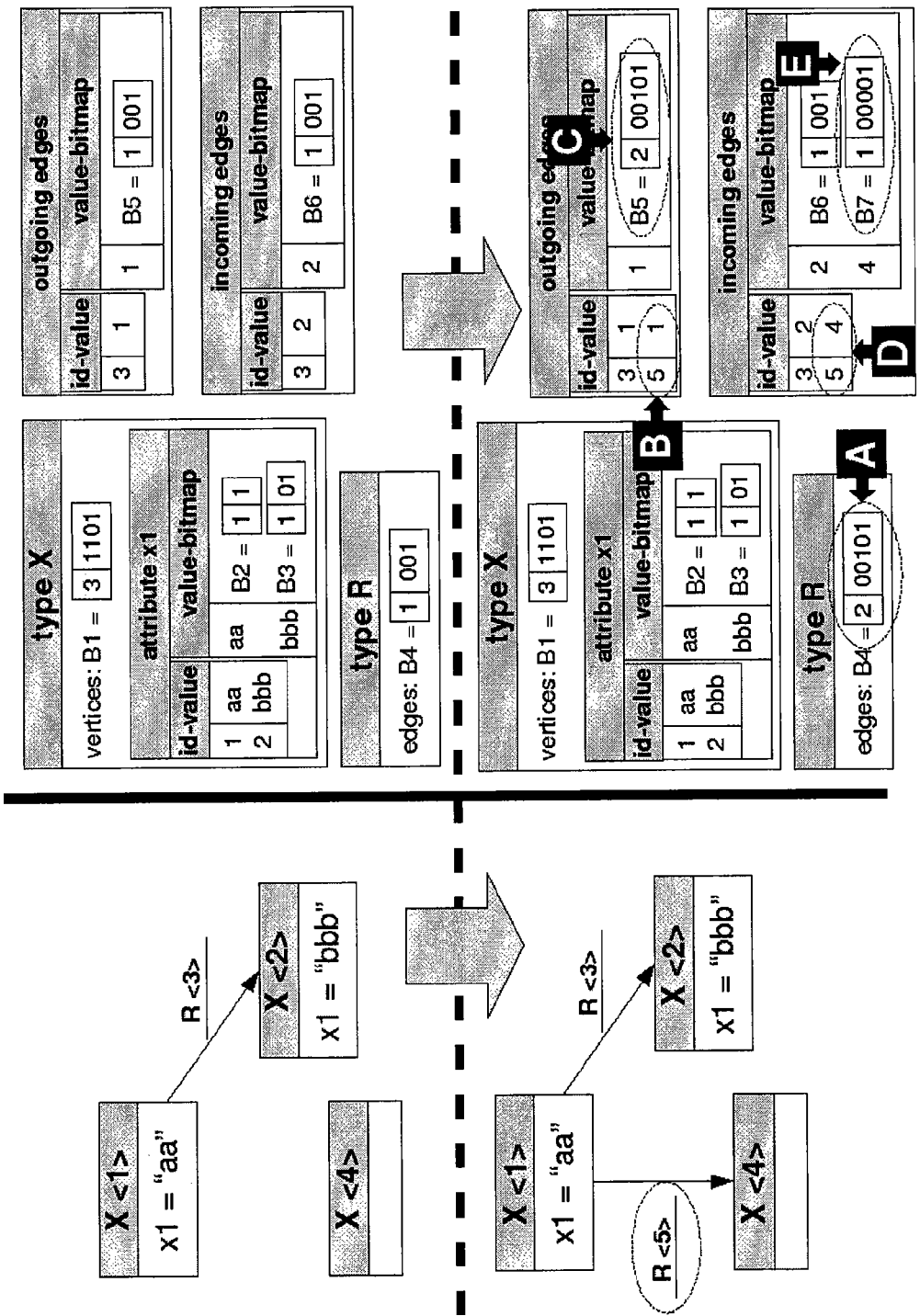
FIG. 8 shows an incoming multigraph and an outgoing multigraph with their respective structures for an insert operation for inserting a directed edge.

To add a new edge to the multigraph, first the position corresponding to the unique edge identifier in the bitmap of edges of its vertex type is marked, and the marked bit counter, which is equal to the total number of edges of said type, is updated (FIG. 8, action A). Then, the association between the edge and the outgoing vertex is updated (FIG. 8, action B) in the mapping of outgoing edges, the position corresponding to the unique edge identifier in the bitmap of outgoing edges of the outgoing vertex is marked, and is updated the marked bit counter, which is equal to the number of outgoing edges from said vertex, is updated (FIG. 8, action C). Likewise, the association between the edge and the incoming vertex is updated (FIG. 8, action D) in the mapping of incoming edges, the position corresponding to the unique edge identifier in the bitmap of incoming edges of the incoming vertex is marked, and the marked bit counter, which is equal to the number of incoming edges to said vertex, is updated (FIG. 8, action E).

To eliminate a vertex from the multigraph, the previous steps must be undone in the same order.

Figure 9:
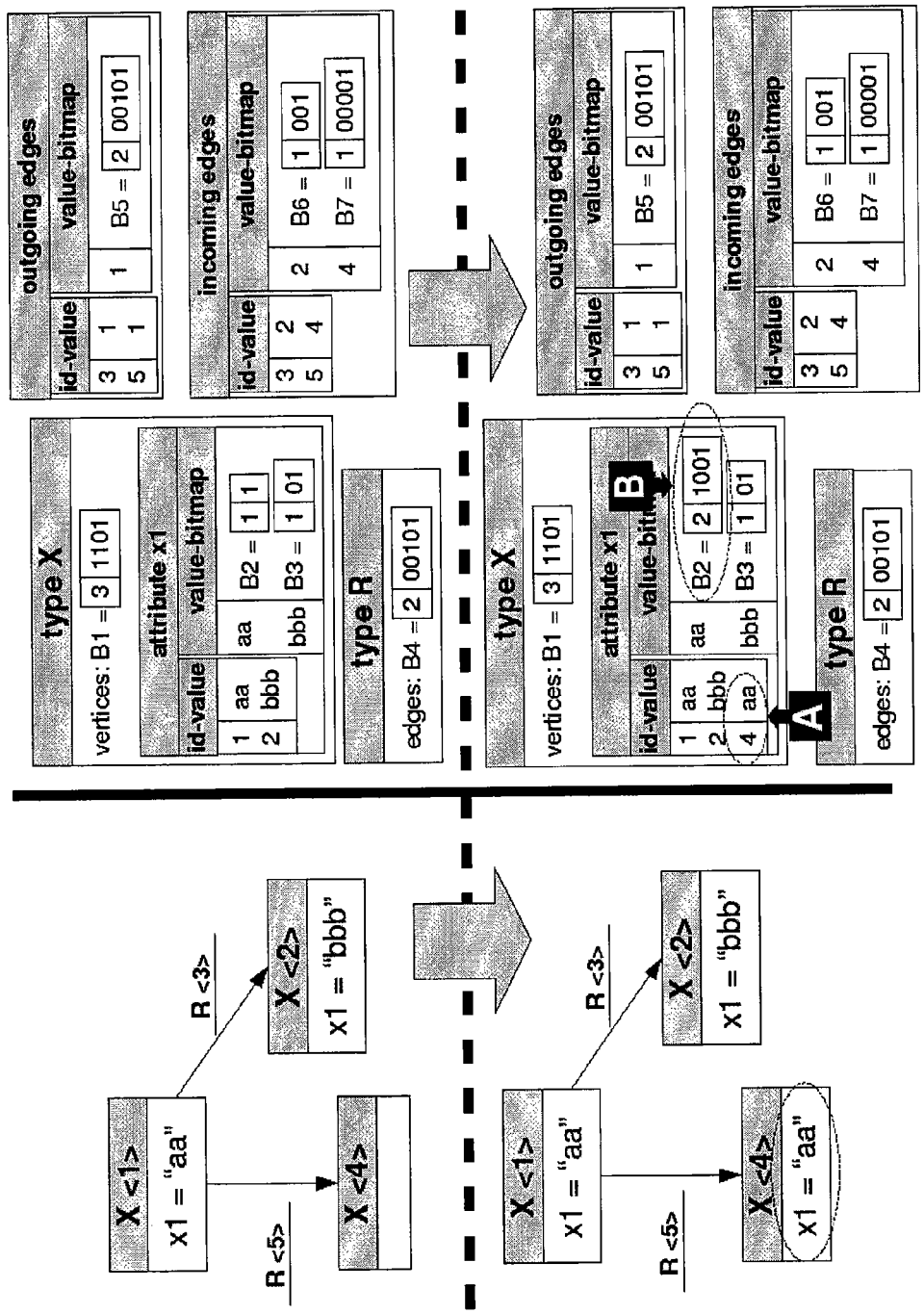
FIG. 9 shows an incoming multigraph and an outgoing multigraph with their respective structures for an insert operation for inserting a value for an attribute of a vertex.

To add a new attribute to a vertex of the multigraph, the association between the unique vertex identifier and the value of the attribute in the mapping of object identifiers and values of the corresponding attribute is updated (FIG. 9, action A). Then, the position corresponding to the unique vertex identifier in the bitmap of vertices associated with the value of the attribute is marked, and the marked bit counter, which is equal to the number of vertices having said value for said attribute, is updated (FIG. 9, action B).

To add a new attribute to an edge of the multigraph, the previous steps for the attribute of the corresponding edge type must be repeated.

To eliminate an attribute from a vertex or edge of the multigraph the previous steps must be undone in the same order.

Figure 10:
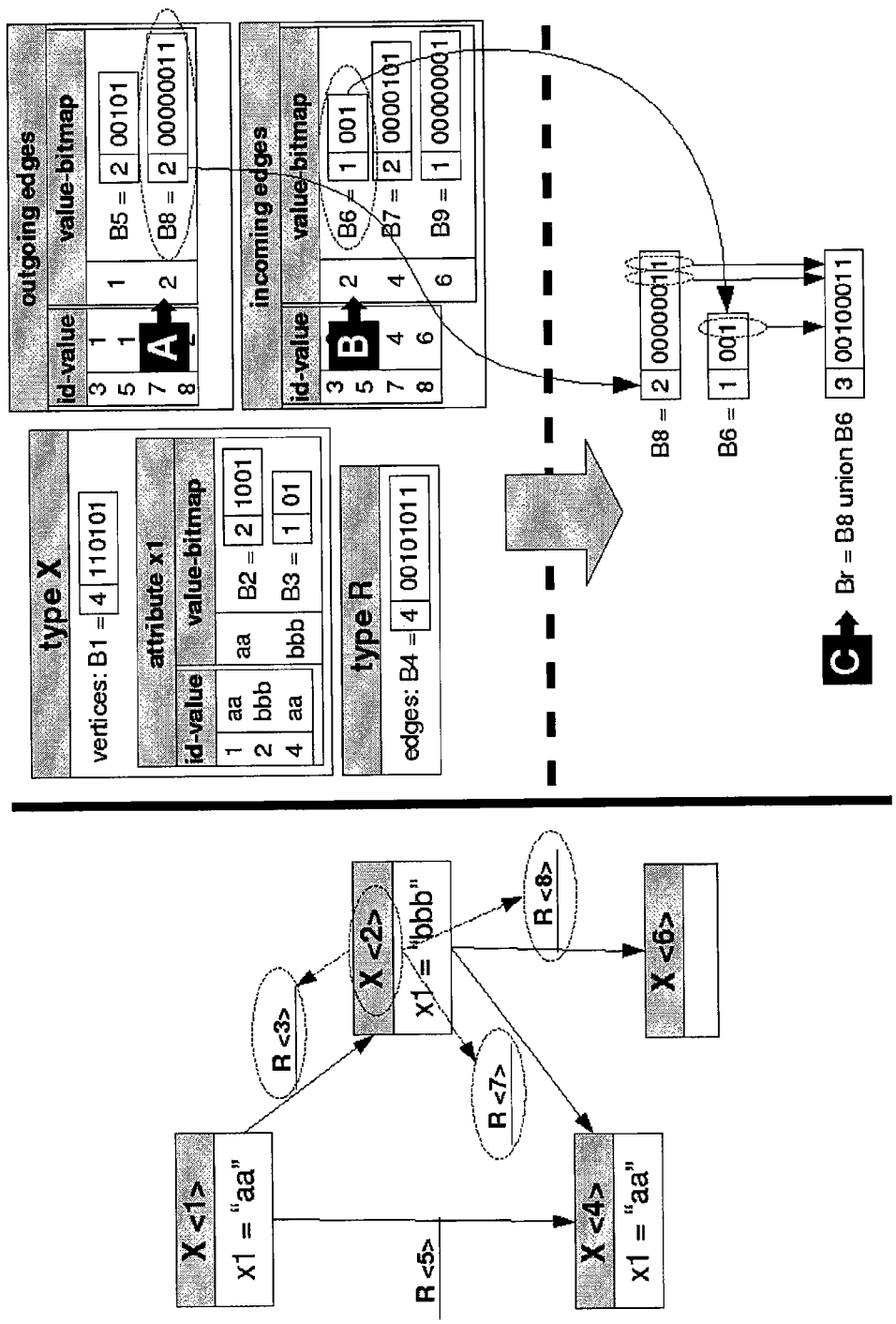
FIG. 10 shows an incoming multigraph with its respective structures, and outgoing structures for an operation to acquire the set of incoming and outgoing edges of a vertex.

To acquire the set of outgoing edges of a vertex, the bitmap associated with the unique vertex identifier in the mapping between outgoing vertices and bitmaps of outgoing edges is selected (FIG. 10, action A).

To acquire the set of incoming edges of a vertex, the bitmap associated with the unique vertex identifier in the mapping between incoming vertices and bitmaps of incoming edges is selected (FIG. 10, action B).

To acquire the complete edge set of outgoing and incoming edges of a vertex, first the bitmap of outgoing edge identifiers is acquired, subsequently the bitmap of incoming edge identifiers is acquired, and finally the bitmap with the incoming and outgoing edges of the vertex is acquired as a result of the bitwise union operation of the two previously selected bitmaps (FIG. 10, action C).

Figure 11:
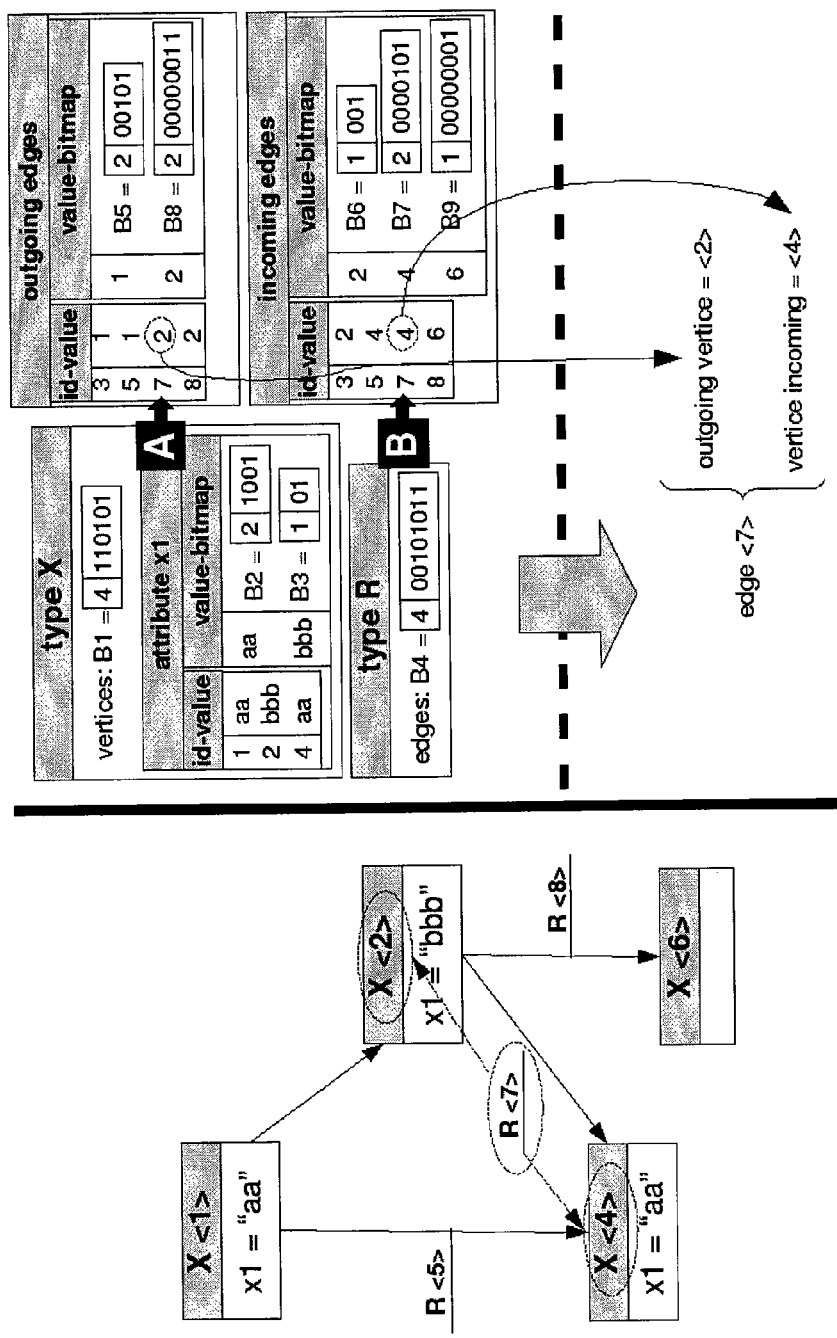
FIG. 11 shows an incoming multigraph with its respective structures, and outgoing structures for an operation for acquiring the incoming and outgoing vertices of an edge.

To acquire the incoming and outgoing vertices of an edge, first the value associated with the unique edge identifier in the mapping between outgoing edges and outgoing vertices is acquired (FIG. 11, action A). Then the value associated with the unique edge identifier in the mapping between incoming edges and incoming vertices is acquired (FIG. 11, action B).

Figure 12:
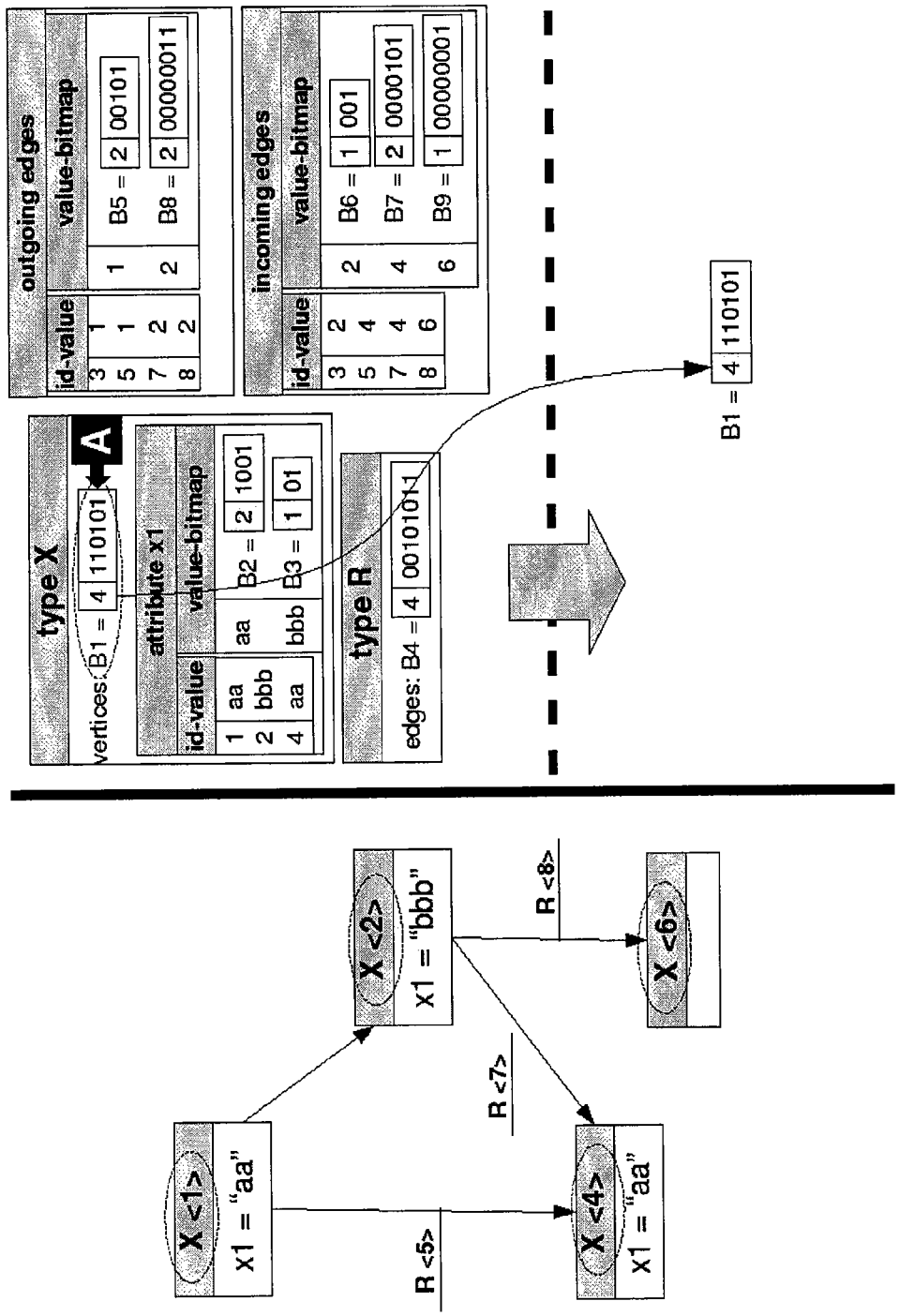
FIG. 12 shows an incoming multigraph with its respective structures, and outgoing structures for an operation for acquiring the vertices of a given type.

To acquire the vertices of a certain vertex type, the bitmap of vertices of said vertex type is selected (FIG. 12, action A).

To acquire the edges of a certain edge type, the bitmap of edges of said edge type is selected.

Figure 13:
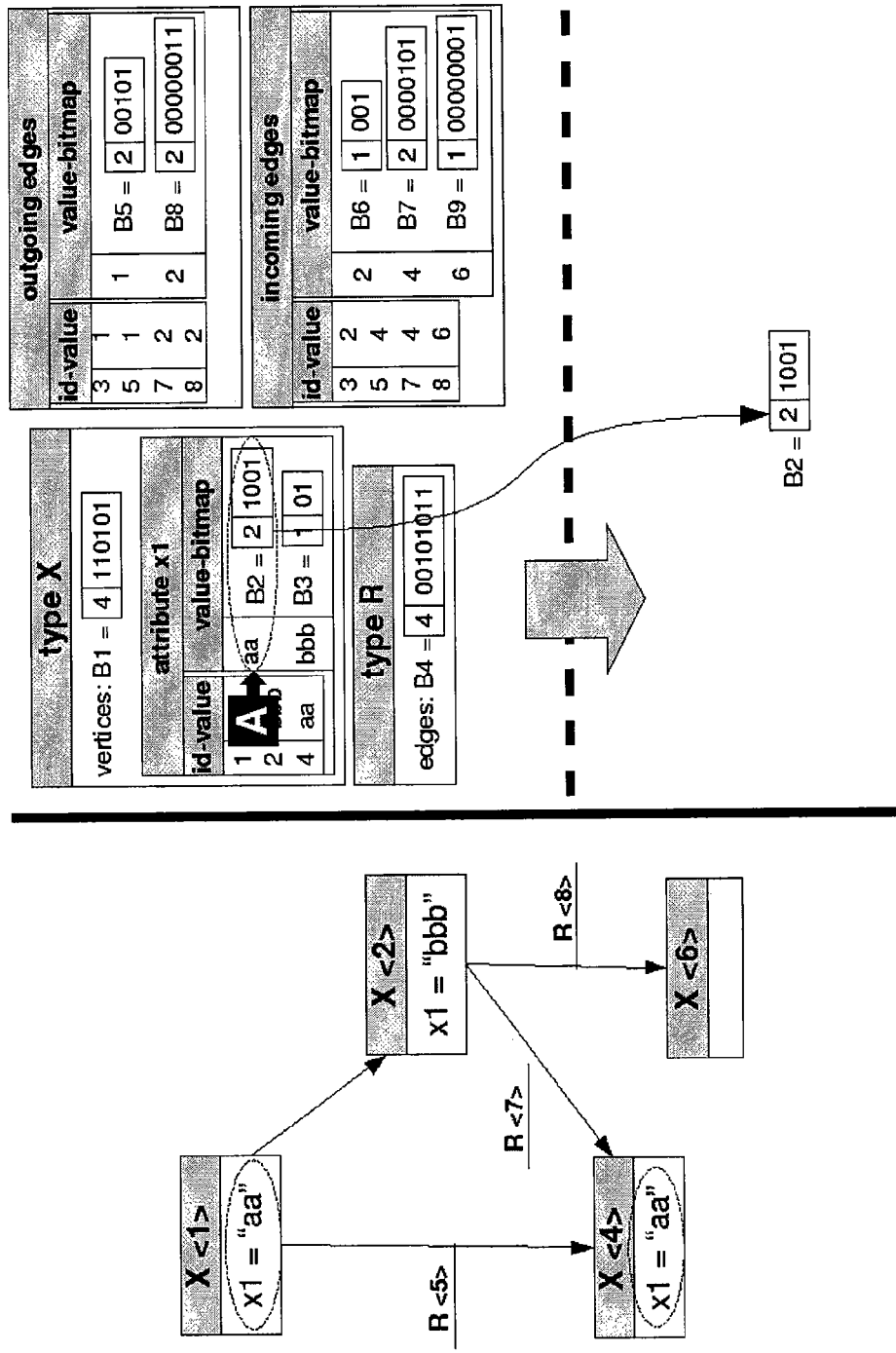
FIG. 13 shows an incoming multigraph with its respective structures, and outgoing structures for an operation for acquiring the vertices of a type which have the same value for a given attribute.

To acquire the vertices of a certain vertex type which have a particular value for an attribute, the bitmap of vertex identifiers associated with said value in the mapping between unique vertex identifiers and values of said attribute of the corresponding vertex type is selected (FIG. 13, action A).

To acquire the edges of a certain edge type which have a particular value for an attribute, the procedure in the previous paragraph is repeated for the corresponding edge type.

Figure 14:
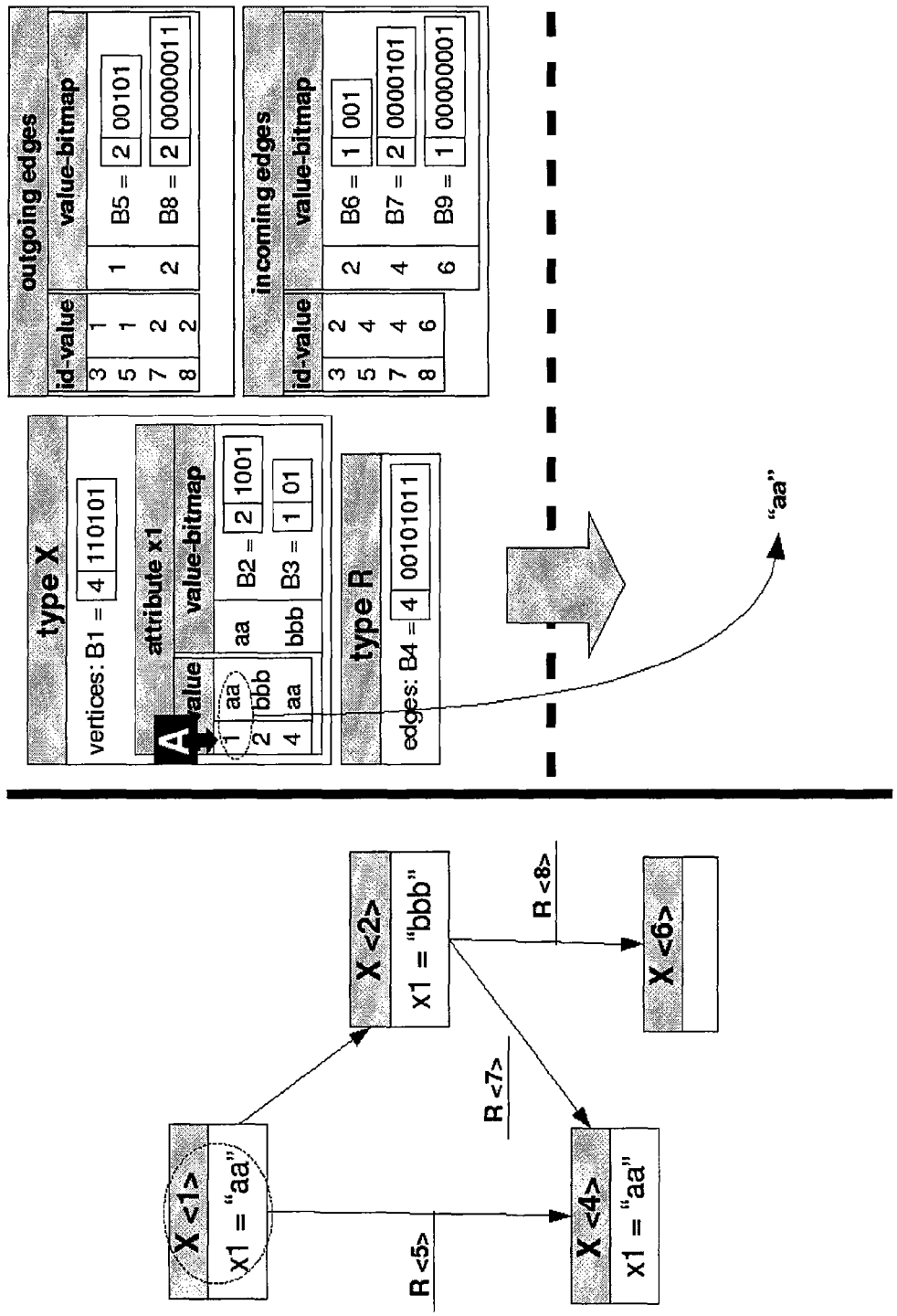
FIG. 14 shows an incoming multigraph with its respective structures, and outgoing structures for an operation for acquiring the value for an attribute of a given vertex.

To acquire the value of an attribute of a given vertex, the value associated with the vertex identifier in the mapping of identifier to value of the attribute of the object type of the vertex is returned (FIG. 14, action A).

To acquire the value of an attribute of a given edge, the procedure in the previous paragraph is repeated for the corresponding edge type.

The present invention generically applies to the handling of any set of organized data in network form.

Although the application on multigraphs such as that of FIG. 1 is preferably carried out through a computer program, it can also be alternatively presented as a digital circuit following the same logic, an industrial design or any combination of the previous three alternatives.

Although a specific modular design is presented by way of example, the same invention can be presented in a different design with a different number of larger or smaller vertices and/or different names for each module.

Although bitmaps are used in the description of the preferred application described in this document, the present invention can be applied for other alternative data structures which allow saving information about the presence of objects, such as for example, compressed bitmaps, bitmaps changing the interpretation of zeros for ones and ones for zeros, any representation of sets of true or false values, etc.

Although mappings are used in the description of the preferred application described in this document, the present invention can be applied for other alternative data structures which allow establishing a univocal association between a code and its value, such as for example, hash tables, binary trees, balanced binary trees, associative matrices, etc.

Although directed labeled multigraphs with attributes are used in the description of the preferred application described in this document, the present invention can be applied even if the multigraph is reduced to a graph, if the multigraph is not directed, if the multigraph is not labeled, if there are no attributes or any combination of the foregoing.

The invention claimed is:

1. A process for transforming and consulting with a computational system directed labeled multigraphs with attributes using data structures in bitmap and mapping form, wherein said data structures comprise:
   - (a.) vertices and edges of a multigraph referred to as objects of the multigraph, and associated with a specific object type, and containing associated values referred to as attributes;
   - (b.) objects of the multigraph identified with a unique numerical identifier;
   - (c.) for each object type, unique numerical identifiers of the objects of the multigraph, according to paragraph b, is stored using a bitmap;
   - (d.) for each attribute associated with an object of the multigraph of a specific type a mapping is used in which, for each value in said attribute a bitmap is assigned containing the number of objects of that type containing said value in said attribute;
   - (e.) for each attribute associated with an object of the multigraph of a specific type a mapping is used in which, for each identifier of each of these objects, the value is assigned in said attribute;
   - (f.) for each vertex with one or more outgoing edges the unique numerical identifier of these edges, according to (b.), stored using a bitmap;
   - (g.) for each vertex with one or more incoming edges the unique numerical identifier of these edges, according to (b.), stored by means of the use of a bitmap;
   - (h.) a mapping relating the unique identifier of the vertices with one or more outgoing edges and the associated bitmaps, according to (d.);
   - (i.) a mapping relating the unique identifier of the edges with the unique identifier of their source vertex;
   - (j.) a mapping relating the unique identifier of the vertices with one or more incoming edges and the associated bitmaps, according to (g.); and
   - (k.) a mapping relating the unique identifier of the edges with the unique identifier of their sink vertex;

said process for transforming comprising transforming a multigraph, wherein inserting a new vertex of a given type involves modifying the bitmap corresponding to that object type as described in (c.), setting a bit to one, marking the bit in the position corresponding to the identifier of that object and increasing an object counter therein.

2. The process for transforming a multigraph according to claim 1, wherein removing an existing vertex v of a given type, involves undoing the steps described in claim 1 in the same order.

3. The process for transforming a multigraph according to claim 1, wherein inserting a new edge, e, of a given type from vertex a to vertex b, involves modifying the bitmap corresponding to that edge type, setting a bit to one, according to (c.) of claim 1, and associating the values corresponding to the identifier of e and the identifiers of the vertices a and b in the mappings, according to (h.), (i.), (j.) and (k.) of claim 1, and marking the bit in the two bitmaps described in (f.) and (g.) corresponding to vertices a and b, in the position corresponding to the identifier of e, and increasing the corresponding object counters therein.

4. The process for transforming a multigraph according to claim 3, wherein removing an existing edge, e, of a given type, involves undoing the steps described in claim 3 in the same order.

5. The process for transforming a multigraph according to claim 1, wherein removing the value v in an attribute a of an object, o, involves removing the association of the value with the object identifier, for attribute a, in the mappings as described in (e.) of claim 1, and setting to zero the bit in the bitmap, described in (d.), corresponding to value v, in the position corresponding to the identifier of o, and decreasing the corresponding object counter therein.

6. The process for transforming a multigraph according to claim 5, wherein setting a new value v in an attribute a of an object, o, involves checking the current value in the attribute a of the object, o, and, if the value exists, removing the association as explained in claim 5, and then inserting the value v by associating the value with the object identifier, for attribute a, through mappings as described in (e.) of claim 1 and marking the bit in the bitmap, described in (d.), corresponding to value v, in the position corresponding to the identifier of o, and increasing the corresponding object counter therein.

7. The process for consulting a multigraph according to claim 1, wherein acquiring the incoming and outgoing edges of a vertex involves accessing two bitmaps through two mappings between the object identifier of said vertex and said bitmaps, according to (h.) and (j.) of claim 1, and the subsequent bitwise logical union operation of the two bitmaps acquired.

8. The process for consulting a multigraph according to claim 1, wherein acquiring the source and sink vertices of an edge involves directly accessing the object identifiers of said vertices through two mappings between the object identifier of said edge and the identifiers of the end vertices, according to (i.) and (k.) of claim 1.

9. The process for consulting a multigraph according to claim 1, wherein acquiring the vertices of a given type involves returning an existing bitmap, according to (c.) of claim 1.

10. The process for consulting a multigraph according to claim 1, wherein acquiring the vertices of a type having a specific value in a given attribute involves returning an existing bitmap which is acquired through a mapping relating the value with the bitmap, according to (d.) of claim 1.

11. The process for consulting a multigraph according to claim 1, wherein acquiring the value of an attribute for a given object involves returning the value associated with the object identifier in the mapping between object identifiers and values of the corresponding attribute, according to (e.) of claim 1.

12. A process for transforming and consulting with a computational system undirected labeled multigraphs with attributes using data structures in bitmap and mapping form, wherein said data structures comprise:
   (a.) vertices and edges of a multigraph referred to as objects of the multigraph, and associated with a specific object type, and containing associated values referred to as attributes;
   (b.) objects of the multigraph identified by means of a unique numerical identifier;
   (c.) for each object type, unique numerical identifiers of the objects of the multigraph, according to paragraph b, is stored using a bitmap;
   (d.) for each attribute associated with an object of the multigraph of a specific type a mapping is used in which, for each value in said attribute a bitmap is assigned containing the number of objects of that type containing said value in said attribute;
   (e.) for each attribute associated with an object of the multigraph of a specific type a mapping is used in which, for each identifier of each of these objects, the value is assigned in said attribute;
   (f.) for each vertex with one or more going edges the unique numerical identifier of these edges, according to paragraph b, stored by using two bitmaps, one to store non-reflexive edges and another one to store reflexive edges;
   (g.) a mapping relating the unique identifier of the vertices with one or more outgoing edges and the associated bitmaps, according to (d.);
   (h.) a mapping relating the unique identifier of the edges with the unique identifier of their source vertex;
   (i.) a mapping relating the unique identifier of the vertices with one or more incoming edges and the associated bitmaps, according to (g.); and
   (j.) a mapping relating the unique identifier of the edges with the unique identifier of their sink vertex;
said process for transforming comprising transforming a multigraph, wherein inserting a new vertex of a given type involves modifying the bitmap corresponding to that object type as described in (c.), setting a bit to one, marking the bit in the position corresponding to the identifier of that object and increasing an object counter therein.

13. The process for transforming a multigraph according to claim 12, wherein removing an existing vertex v of a given type, involves undoing the steps described in claim 12 in the same order.

14. The process for transforming a multigraph according to claim 12, wherein inserting a new edge e of a given type from vertex a to vertex b, involves modifying the bitmap corresponding to that edge type, setting a bit to one, according to (c.) of claim 12, and associating the values corresponding to the identifier of e and the identifiers of the vertices a and b in the mappings, according to (g.), (h.), (i.) and (j.), of claim 12, and marking the bits in the bitmap described in (f.) corresponding to vertices a and b, in the position corresponding to the identifier of e, and increasing the corresponding object counters therein and, in the case of being a reflexive edge (that is, a is equal to b), marking the bit in the bitmap storing reflexive edges corresponding to the vertice a.

15. The process for transforming a multigraph according to claim 14, wherein removing an existing edge, e of a given type, involves undoing the steps described in claim 14 in the same order.

16. The process for transforming a multigraph according to claim 12, wherein removing the value v in an attribute a of an object, o, involves removing the association of the value with the object identifier, for attribute a, in the mappings as described in (e.) of claim 12, and setting to zero the bit in the bitmap, described in (d.), corresponding to value v, in the position corresponding to the identifier of o, and decreasing the corresponding object counter therein.

17. The process for transforming a multigraph according to claim 16, wherein setting a new value v in an attribute a of an object, o, involves checking the current value in the attribute a of the object, o, and, if the value exists, removing the association as explained in claim 16, and then inserting the value v by associating the value with the object identifier, for attribute a, through mappings as described in (e.) of claim 12 and marking the bit in the bitmap, described in (d.), corresponding to value v, in the position corresponding to the identifier of o, and increasing the corresponding object counter therein.

18. The process for consulting a multigraph according to claim 12, wherein acquiring the incoming and outgoing edges of a vertex involves accessing two bitmaps through two mappings between the object identifier of said vertex and said bitmaps, according to (h.) and (j.) of claim 12, and the subsequent bitwise logical union operation of the two bitmaps acquired.

19. The process for consulting a multigraph according to claim 12, wherein acquiring the source and sink vertices of an edge involves directly accessing the object identifiers of said vertices through two mappings between the object identifier of said edge and the identifiers of the end vertices, according to (h.) and (j.) of claim 12.

20. The process for consulting a multigraph according to claim 12, wherein acquiring the vertices of a given type involves returning an existing bitmap, according to (c.) of claim 12.

21. The process for consulting a multigraph according to claim 12, wherein acquiring the vertices of a type having a specific value in a given attribute involves returning an existing bitmap which is acquired through a mapping relating the value with the bitmap, according to (d.) of claim 12.

22. The process for consulting a multigraph according to claim 12, wherein acquiring the value of an attribute for a given object involves returning the value associated with the object identifier in the mapping between object identifiers and values of the corresponding attribute, according to (e.) of claim 12.

* * * * *